US009967581B2

(12) United States Patent
Chung et al.

(10) Patent No.: US 9,967,581 B2
(45) Date of Patent: May 8, 2018

(54) VIDEO QUALITY ADAPTATION WITH FRAME RATE CONVERSION

(71) Applicant: Apple Inc., Cupertino, CA (US)

(72) Inventors: Chris Y. Chung, Sunnyvale, CA (US);
Hsi-Jung Wu, San Jose, CA (US);
Xiaosong Zhou, Campbell, CA (US);
Dazhong Zhang, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 420 days.

(21) Appl. No.: 14/290,432

(22) Filed: May 29, 2014

(65) Prior Publication Data

US 2015/0350654 A1     Dec. 3, 2015

(51) Int. Cl.
| | |
|---|---|
| *H04N 7/12* | (2006.01) |
| *H04N 19/46* | (2014.01) |
| *H04N 19/156* | (2014.01) |
| *H04N 19/172* | (2014.01) |
| *H04N 19/132* | (2014.01) |
| *H04N 19/154* | (2014.01) |
| *H04N 19/164* | (2014.01) |
| *H04N 19/587* | (2014.01) |

(52) U.S. Cl.
CPC .......... *H04N 19/46* (2014.11); *H04N 19/132* (2014.11); *H04N 19/154* (2014.11); *H04N 19/156* (2014.11); *H04N 19/164* (2014.11); *H04N 19/172* (2014.11); *H04N 19/587* (2014.11)

(58) Field of Classification Search
CPC ....................................................... H04N 16/46
USPC .................................................... 375/240.06
See application file for complete search history.

(56) References Cited

U.S. PATENT DOCUMENTS

| | | | |
|---|---|---|---|
| 7,158,186 B2 | 1/2007 | Selby et al. | |
| 8,068,683 B2 | 11/2011 | DeCegama | |
| 8,134,640 B2 | 3/2012 | Doswald | |
| 8,571,388 B2 | 10/2013 | Uchlike et al. | |
| 2012/0206645 A1* | 8/2012 | Ozawa | H04N 7/17318 348/425.3 |
| 2015/0188966 A1* | 7/2015 | Eyler | H04L 65/602 709/231 |
| 2015/0222921 A1* | 8/2015 | Sato | H04N 19/44 375/240.12 |

* cited by examiner

*Primary Examiner* — Richard Torrente
(74) *Attorney, Agent, or Firm* — Baker & Hostetler LLP

(57) ABSTRACT

During video coding, frame rate conversion (FRC) capabilities of a decoder may be estimated. Based on the estimated FRC capabilities, an encoder may select a frame rate for a video coding session and may alter a frame rate of source video to match the selected frame rate. Thereafter, the resultant video may be coded and output to a channel. By incorporating knowledge of a decoder's FRC capabilities as source video is being coded, an encoder may reduce the frame rate of source video opportunistically. Bandwidth that is conserved by avoiding coding of video data in excess of the selected frame rate may be directed to coding of the remaining video at a higher bitrate, which can lead to increased quality of the coding session as a whole.

36 Claims, 5 Drawing Sheets

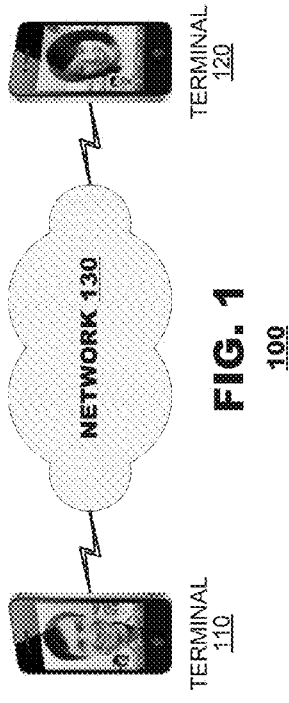
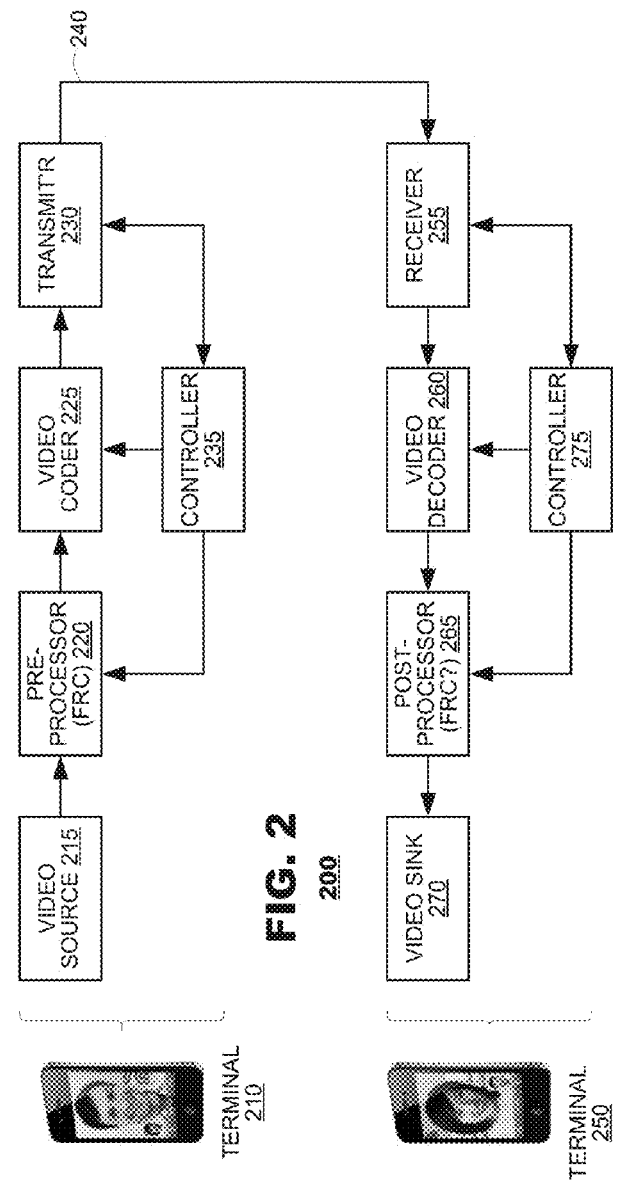

300

500

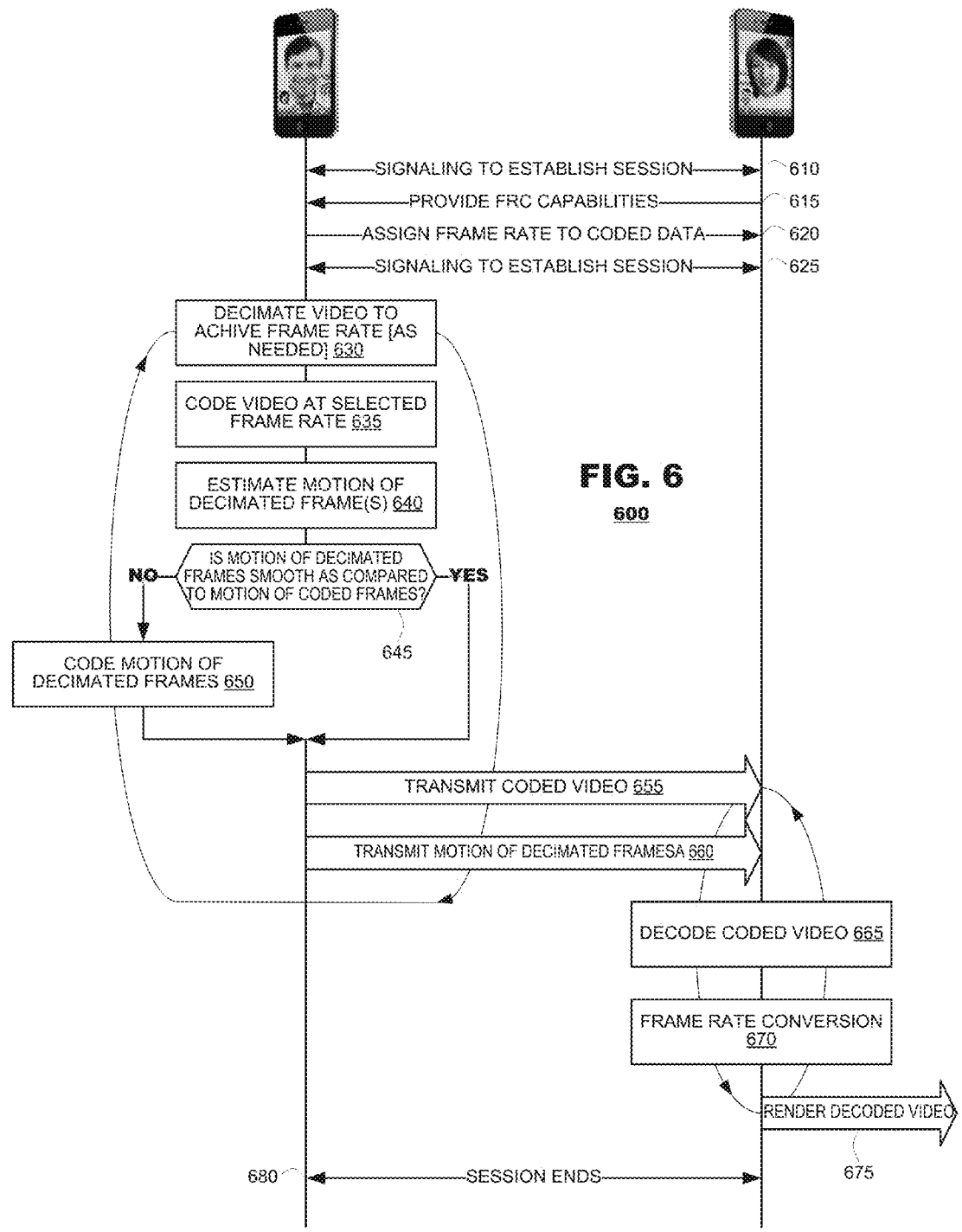

VIDEO QUALITY ADAPTATION WITH FRAME RATE CONVERSION

BACKGROUND

The present invention relates to video coding and, in particular, to tailoring coding parameters to decoder attributes.

Modern coding systems employ a coding terminal and decoding terminal to capture, code, deliver and decode source video. The capabilities of such terminal equipment vary considerably. To increase inter-device operation, several coding protocols have been defined. An encoder may code source video data using coding parameters and a syntax defined by one of the coding parameters (such as the ITU-T's H.265 or H.264 standards) and output the coded video data to a channel. If the coded video data complies with the requirements of its governing protocol, any decoding device that operates in compliance with the protocol will be able to decode and render the coded video data.

There is such a wide variety in encoding and decoding devices, however, that such mere adherence to a coding protocol cannot guarantee that source video will be coded in the most efficient manner or that the coded video data, once decoded, will have the highest visual quality that can be achieved by those devices.

Accordingly, the inventors perceive a need in the art for a protocol for exchange between an encoding terminal and a decoding terminal that contributes to improved coding quality and efficiency over the qualities and efficiencies that are achieved through use of the governing protocols.

BRIEF DESCRIPTION OF THE DRAWINGS

FIG. 1 is a simplified block diagram of a video coding system according to an embodiment of the present invention.

FIG. 2 is a simplified block diagram of functional units within terminals to support video exchange, according to an embodiment of the present invention.

FIG. 6 illustrates another communication flow between a pair of terminals according to an embodiment of the present invention.

DETAILED DESCRIPTION

Figure 3:
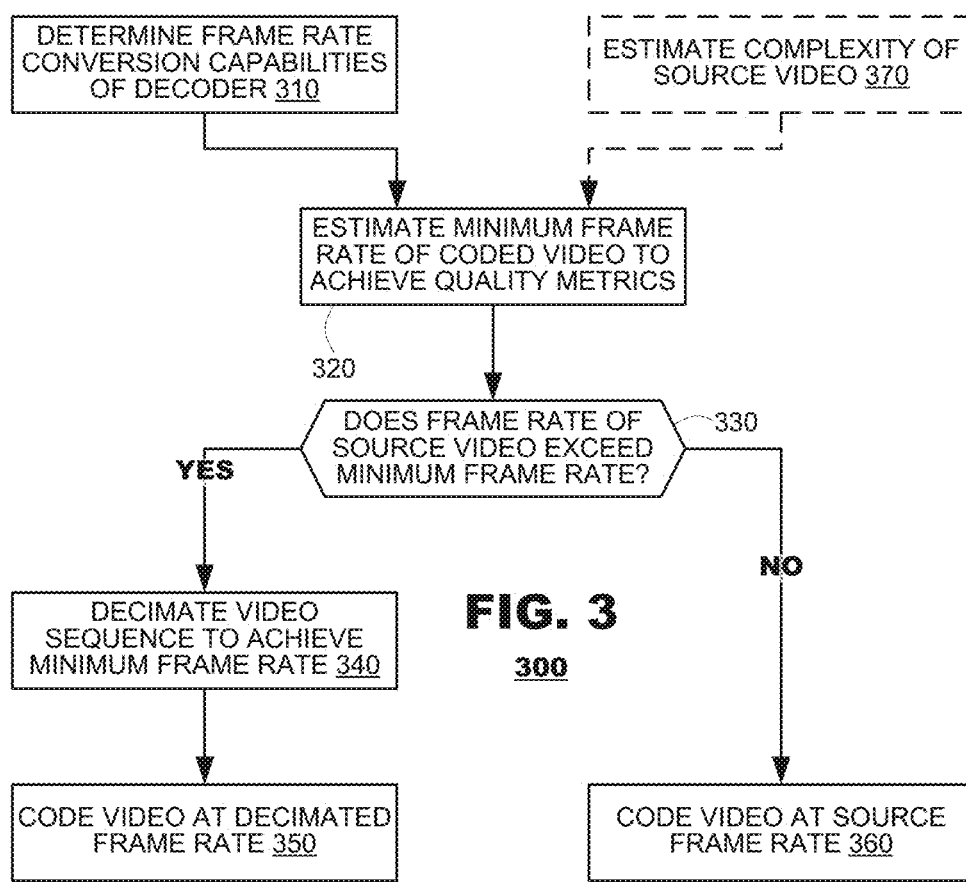
FIG. 3 illustrates a coding method according to an embodiment of the present invention.

Embodiments of the present invention provide techniques for coding video data in which frame rate conversion (FRC) capabilities of a decoder may be estimated. Based on the estimated FRC capabilities, an encoder may select a frame rate for a video coding session and may alter a frame rate of source video to match the selected frame rate. Thereafter, the resultant video may be coded and output to a channel. By incorporating knowledge of a decoder's FRC capabilities as source video that is being coded, an encoder may reduce the frame rate of source video opportunistically. Bandwidth that is conserved by avoiding coding of video data in excess of the selected frame rate may be directed to coding of the remaining video at a higher bitrate, which can lead to increased quality of the coding session as a whole.

FIG. 1 illustrates a simplified block diagram of a video coding system 100 according to an embodiment of the present invention. The system 100 may include a plurality of terminals 110, 120 interconnected via a network 130. The terminals 110, 120 may support either unidirectional or bidirectional exchange of coded video data. For bidirectional video exchange, each terminal 110, 120 may capture video data at a local location and code the video data for transmission to the other terminal via the network 130. Each terminal 110, 120 may receive the coded video data of the other terminal from the network 130, decode the coded data and display the recovered video data locally. For unidirectional exchange of video, only one of the terminals (say terminal 110) would capture video locally and code it for transmission to the other terminal. The second terminal 120 would decode the coded video and display it locally.

In FIG. 1, the terminals 110, 120 are illustrated as smart phones but the principles of the present invention are not so limited. Embodiments of the present invention find application with personal computers (both desktop and laptop computers), tablet computers, computer servers, media players and/or dedicated video conferencing equipment. The network 130 represents any number of networks that convey coded video data between the terminals 110, 120, including for example wire-line and/or wireless communication networks. The communication network 130 may exchange data in circuit-switched and/or packet-switched channels. Representative networks include telecommunications networks, local area networks, wide area networks and/or the Internet. For the purposes of the present discussion, the architecture and topology of the network 130 are immaterial to the operation of the present invention unless explained hereinbelow.

FIG. 2 is a simplified functional block diagram of functional units within terminals 210, 250 to support video exchange, according to an embodiment of the present invention. The terminal 210, for example, may include a video source 215, a pre-processor 220, a video coder 225 and a transmitter 230, all operating under control of a controller 235. The video source 215 may provide source video data representing the video content to be coded and transmitted to the second terminal 250. The pre-processor 220 may perform signal conditioning operations to tailor the source video data for coding by the video coder 225. The video coder 225 may code the source video data according to predictive coding techniques to reduce the video's bandwidth. The transmitter 230 may format coded video data from the video coder 225 for transmission to the second terminal 250 via a channel 240.

The video source 215 may be represented by a camera system that may include an image sensor and related circuitry to generate video data representing locally-captured image content. In other embodiments, however, the video source 215 may be represented by a storage device that stores video data authored from other sources (for example, computer graphics or the like). Alternatively, the source video may include synthetically-generated image content authored by an application or other processes that executes on the terminal 210.

The pre-processor 220 may perform operations upon the source video to condition it for coding and/or transmission. Typical pre-processing operations include resizing of video, frame rate conversion of video and/or video filtering operations. Resizing operations may enlarge or reduce the size of video frames in the source video. Frame rate conversions may increase or decrease the frame rate of the source video. Filtering operations may include a variety of processing operations to either increase or decrease spatial and/or temporal smoothness of content in the source video. While the present discussion focuses on frame rate conversion operations of the pre-processor 220, in practice, such operations may be performed cooperatively with other pre-processing operations as may be desired to achieve given application needs. Moreover, the types of pre-processing operations applied to source video may vary dynamically based on operating conditions of the terminal 210, including availability of processing resources at the terminal 210, conditions of a channel 240 and any operating conditions of a far end terminal 250 that are reported to the terminal 210. The pre-processor 220 may provide pre-processed video to the video coder 225.

The video coder 225 may code the video data presented to it by the pre-processor 220. The video coder 225 may exploit spatial and/or temporal redundancies in the input video by coding the input video according to motion-compensated prediction. Such processes typically involve coding content of a new frame with reference to content of previously-coded reference frames. When a prediction is made between content of a new frame and a previously-coded reference frame, the video coder 225 may provide prediction references (which may be explicit or implicit) in the coder's output, which allows a decoder to invert the prediction operations during decoding. Prediction often operates on spatial areas of an input frame (called, "pixel blocks" herein), on a pixel-block-by-pixel-block basis. Such prediction references often include motion vectors, which identify spatial translations of image content between a frame being coded and a reference frame. The video coder 225 also may include a local decoder (not shown) to decode and store coded video data of reference frames for use in subsequent prediction operations. Video coding operations may occur according to predetermined coding protocols such as the MPEG-2, MPEG-4, H.263, H.264 and/or HEVC coding protocols.

The transmitter 230 may format coded video data for transmission in a channel 240. The channel 240 itself may operate according to predetermined communication protocols. The transmitter 230 may format the coded video data according to the protocols that are appropriate for the channel 240 and may output the coded video data to the channel 240.

The second terminal 250 may include a receiver 255, video decoder 260, post-processor 265 and video sink 270. The receiver 255 may receive data from the channel 240 and parse the channel data into various data stream(s), including a stream of coded video. The video decoder 260 may decode the coded video data, inverting coding processes performed by the video coder 225, to recover video data therefrom. The post-processor 265 may perform signal conditioning operations on recovered video data from the video coder to improve video quality prior to rendering. The video sink 270 may consume video data output by the post-processor 265, typically, by displaying it on a display of the terminal 250.

As noted, the video decoder 260 may decode the video data by inverting coding processes applied by the video coder 225. The video decoder 260 may interpret coded video to identify prediction references therein, then apply them during coding operations. Thus, when the video coder 225 codes a given pixel block of a new frame using a reference frame as a source of prediction, the video decoder 260 may use the prediction reference data to identify the same content of the reference frame that video coder 225 used and perform its own prediction operation. The video decoder 260 may output recovered video to the pre-processor. The video decoder 260 also may store video of recovered reference frames for use in subsequent prediction operations. As with the video coder 225, video decoding operations may occur according to predetermined coding protocols such as the MPEG-2, MPEG-4, H.263, H.264 and/or HEVC coding protocols.

The post-processor 265 may perform additional video processing to condition the recovered video data for rendering, commonly at a display device. Typical post-processing operations may include filtering, resizing and/or frame rate conversions. Common filtering operations include deblocking filters, edge detection filters, ringing filters and the like. Resizing operations may enlarge or reduce the size of video frames in the recovered video. Frame rate conversions may increase or decrease the frame rate of the recovered video. The post-processor 265 may output recovered video sequence to video sink 270.

A terminal 250 often selects among the different post-processing operations to be applied to recovered video data based on a local assessment of the quality of recovered video data. The terminal's selection of post-processing operations often is performed without regard to any selection of pre-processing operations that were applied by the coding terminal 210. Oftentimes, a coding terminal 210 will not include in coded video data any identification of the pre-processing operations that it applied to source video.

Post-processing capabilities may vary among different terminals. Some terminals, particularly those that have large processing resources, may employ frame conversion processes that generate relatively high quality image output from a given input video sequence. Other terminals, often those that have lower processing resources, may employ frame rate conversion processes that generate relatively lower quality image output from the same input video sequence. Still other terminals may not have any capability to perform frame rate conversion.

The video sink 270 may consume recovered video data output by the post-processor 265. Most often, the video sink 270 may be represented by a display that renders the recovered video data for view on the terminal 250. Video sinks 270 may include storage devices that store recovered video data later use by the terminal 250, such as by later viewing or later transmission to other devices (not shown).

The functional blocks illustrated in FIG. 2 support video coding and decoding in one direction only. For bidirectional communication, terminal 250 may include functional blocks (not shown) for video coding of locally-captured video and terminal 210 may include functional blocks (also not shown) for decoding of coded video data received from the terminal 250 via the network 240. Although it is envisioned that the principles of the present invention may be applied at coders resident at either terminal 210, 250, the functional blocks provided for the terminal 250 to terminal 210 coding direction are omitted from FIG. 2 merely to simplify the present discussion.

As indicated, the coding and decoding terminals may adhere to predetermined coding protocols. The controllers 235 and 275 may exchange signaling as part of those protocols, for example, to exchange data regarding setup and teardown of video coding sessions. The controllers 235 and 275 also may exchange signaling to request and/or report data regarding each terminal's frame rate conversion capabilities.

FIG. 3 illustrates a method 300 for coding source video according to an embodiment of the present invention. The method 300 may begin by estimation, at an encoder, frame rate conversion capabilities of a decoder to which coded video data will be delivered (box 310). Based on the decoder frame rate conversion capabilities, an encoder may estimate a minimum frame rate that a source video stream must have to meet a quality metric that governs a video coding session (box 320). The method 300 may compare an actual frame rate of the source video to the estimated frame rate (box 330) and, if the actual frame rate of the source video exceeds the estimate frame rate, the method may decimate frames to conform the frame rate of the source video to the estimate (box 340). Thereafter, the method 300 may code the source video at the resultant frame rate (box 350).

If, at box 330, the actual frame rate of the source video is equal to or less than the minimum frame rate, the method 300 may code the source video at the source video's original frame rate (box 360). Alternatively, the method 300 may perform an FRC of its own to boost the source frame rate to match the minimum frame rate identified by the estimate.

Estimates of a decoder's frame rate conversion capabilities may occur in a variety of ways. In one embodiment, an encoder and a decoder may exchange signaling that identifies the decoder's frame rate conversion capabilities expressly. In another embodiment, an encoder may derive a decoder's frame rate conversion capabilities from profile information that describes the decoder. For example, an encoder may code video data to a predetermined profile of a decoder, where the profile identifies the decoder's processing resources and capabilities. In such an example, the encoder may derive the decoder's capabilities from its profile.

In another embodiment, the estimate may include an estimate of a relative difficulty of performing reliable FRC processes on decoded data. For example, an encoder may estimate motion components in source video and estimate, based on the motion, a likelihood that FRC processes will obtain accurate video on decode. An encoder may select a minimum frame rate for coded video based on these estimates.

In an embodiment, an encoder's estimation of a minimum frame rate necessary to achieve governing quality metrics may consider not only the frame rate conversion capabilities of a decoder but also complexity of the source video to be coded. Accordingly, the method 300 may perform an analysis of the source video (box 370) to estimate a degree of corruption that may be introduced by frame rate decimation at the encoder-side and frame rate enhancement at the decoder-side. Such corruption can be influenced, for example, by motion of objects within video content which may lead to occlusions in video during frame rate conversions operations. The method 300, therefore, may estimate an amount of corruption that might be induced by video content and tailor the estimate of minimum frame rate (box 320) accordingly.

Optionally, the encoder's estimate of a minimum frame rate can be influenced by other operational parameters of the decoding terminal, which may be provided to an encoder. These parameters may include one or more of:

- dynamic ranges of frames that are to be displayed at the decoding terminal, both decoded frames and frames generated by the decoder's FRC processes;
- a color gamut of frames that are to be displayed at the decoding terminal, both decoded images and estimates of images generated by the decoder's FRC processes;
- ambient lighting conditions around a display of the decoding terminal;
- size and/or resolution of a display of the decoding terminal;
- complexity of motion tracking (speed of motion, randomness of motion) in the scene as compared to FRC capabilities at the decoding terminal; and
- temporal gradients along co-located pixels on frames that are to be displayed at the decoding terminal, both decoded frames and frames generated by the decoder's FRC processes.

In an embodiment, coding operations performed by an encoding terminal may be adjusted to account for FRC capabilities at a decoding terminal. For example, an encoding terminal may identify portions of video content for which FRC processes are likely to induce errors. The quality of FRC processes often depend on the quality of motion estimation processes, whose performance can be improved when video content has distinctive features that can be identified and tracked within a video sequence. In an embodiment, when an encoding terminal identifies region(s) that are difficult to be processed well by FRC processing, the encoding terminal may perform higher quality coding of image content for those difficult regions from which FRC processing is to derive image content of new frames. For example, an encoding terminal may apply a relatively lower quantization parameter to such regions, which may preserve image content. In this manner, the quality of FRC processing and its output may be improved.

In another embodiment, an encoding terminal and a decoding terminal both may include FRC processing in its coding "loop." The coding loop refers to decoding processes that are performed both by an encoding terminal and a decoding terminal to generate reference pictures for use in prediction of later-processed frames. In such an embodiment, an encoder may select a frame generated by FRC processing for use as a reference picture and may provide signaling to a decoder in coded video data identifying the FRC-generated frame as a reference frame. In response to such signaling, the decoder may perform its own FRC processing and generate the same FRC-generated frame as the encoding terminal. Both the encoding terminal and the decoding terminal may store the FRC-generated frame in their respective reference frame caches (not shown) for later use.

The principles of the present invention may find application in a multi-way video session in which an encoding terminal codes video for distribution to a plurality of decoding terminals. In this embodiment, the encoding terminal may collect information regarding FRC capabilities of all decoding terminals and select a minimum target frame rate based on available bandwidth and processing complexity that can achieve a target average quality for all the decoding terminals. Additionally, the encoder may code the source video in a hierarchical frame structure and designate lower level (less coded frames) to decoders with higher FRC capability, and higher level (more coded frames) to those with lower FRC capability.

Figure 4:
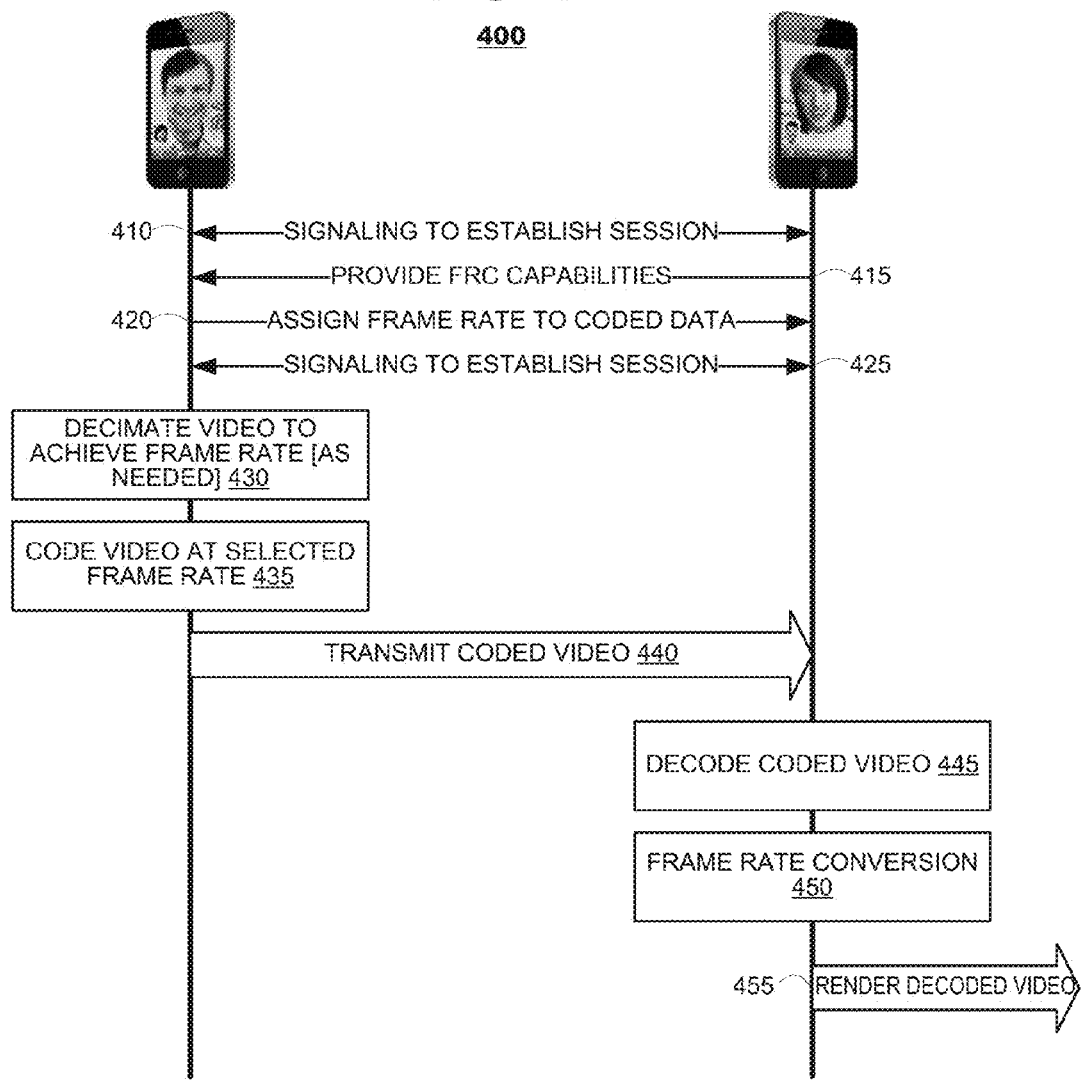
FIG. 4 illustrates communication flow between a pair of terminals according to an embodiment of the present invention.

FIG. 4 illustrates communication flow 400 between a pair of terminals according to an embodiment of the present invention. The terminals may exchange signaling 410 to build a communication session between them. As part of this exchange, a decoding terminal may provide signaling 415 that identifies, to an encoding terminal, the decoding terminal's frame rate conversion capabilities. Based on this information and based on information identifying characteristics of input video, an encoding terminal may assign a frame rate at which input video is to be coded and may communicate 420 this assignment to the decoding terminal. The terminals may exchange other signaling 425 to complete establishment of the communication session.

The video coding session may proceed by an encoding terminal coding video for delivery to the decoding terminal. Specifically, the coding terminal may decimate input video to achieve the frame rate identified to the decoding terminal (box 430). Decimation may include dropping of input frames and/or interpolation of frames from the input frames when the input frames are received at a frame rate higher than the frame rate identified to the decoding terminal. Thereafter, the encoding terminal may code the resultant video data at the selected frame rate (box 435). Video coding may exploit spatial and/or temporal redundancy in the resultant video data by, for example, coding according to motion-compensated prediction. A coded video sequence obtained therefrom may be transmitted to the decoding terminal (arrow 440). The coding terminal may repeat the operations of elements 430-440 until the video session concludes.

The decoding terminal may recover video data during the video coding session. Specifically, the decoding terminal may decode the coded video data that it receives (box 445) by inverting coding operations applied by the encoding terminal. After decoding, the decoding terminal may generate recovered video data. In lossy coding processes, the recovered video data output by the decoding 445 may be a replica of the video data coded by the coding operation 435 but with some data loss. The decoding terminal may perform frame rate conversion (box 450) to increase the frame rate of the recovered video data. Thereafter, the decoding terminal may render the resultant video data, for example, by presenting the video data on a display device.

As indicated, frame rate conversion capabilities may vary by decoder. Some decoders may increase frame rates by averaging content of received frames whereas other, more robust decoders may increase frame rates by performing motion tracking and extrapolation. Thus, in different applications, operation of the flow diagram of FIG. 4 may cause an encoding terminal to make different assignments of coding frame rates as the encoding terminal interacts with different decoding terminals. In a first video coding session, when an encoding terminal receives data from a decoding terminal that indicates its FRC capabilities have relatively low performance, the encoding terminal might select a relatively high coding rate, for example, 30 frames per second. In a second video coding session, when the encoding terminal receives data from a second decoding terminal that indicates its FRC capabilities have relatively high performance, the encoding terminal might select a lower coding rate, for example, 10 frames per second. By coding an input video sequence at a lower frame rate during video coding sessions involving decoding terminals with high FRC capabilities, an encoder may be able to code input video at lower bit rates.

Figure 5:
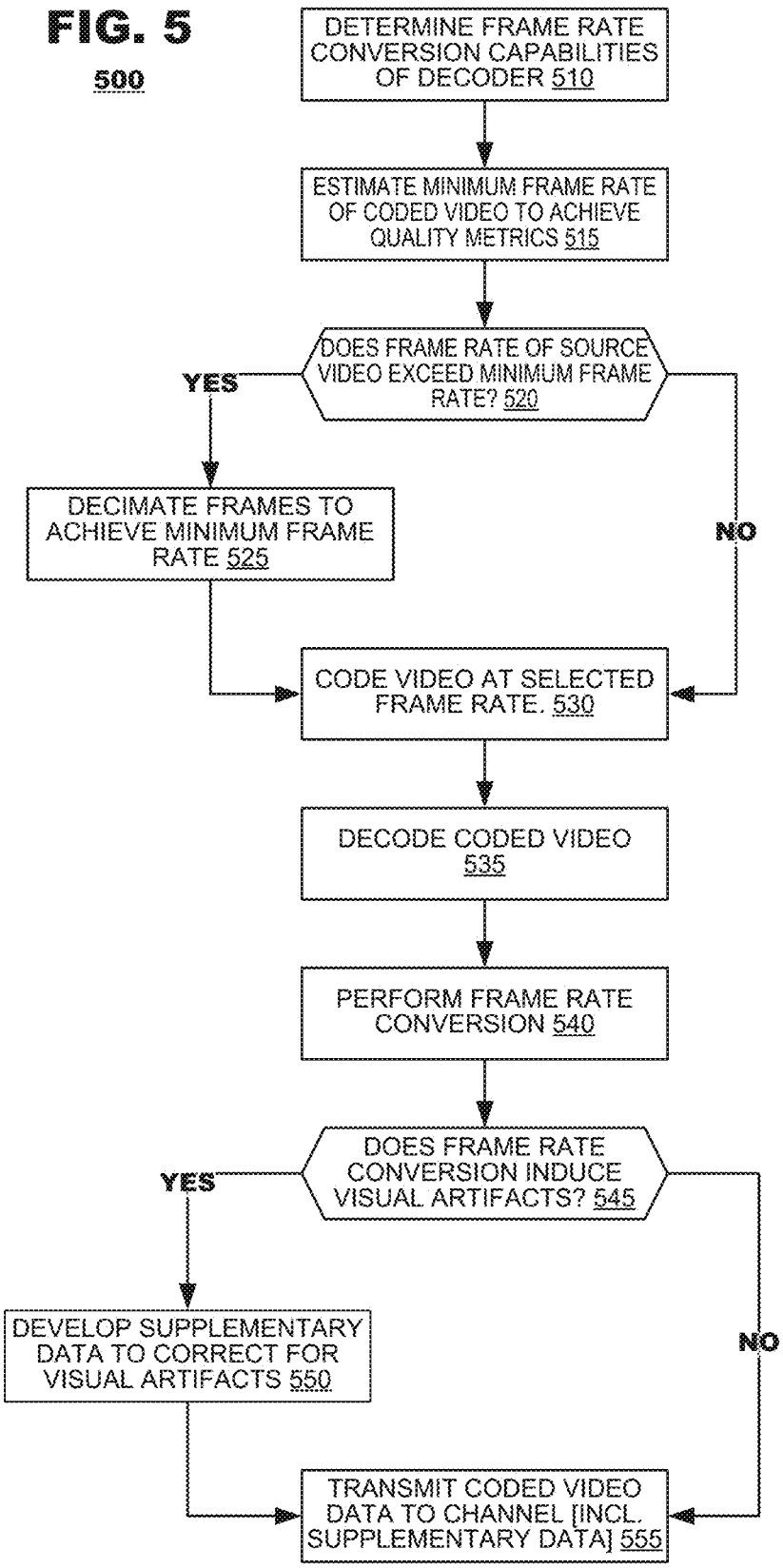
FIG. 5 illustrates another method according to an embodiment of the present invention.

FIG. 5 illustrates another method 500 according to an embodiment of the present invention. The method 500 may be performed by an encoding terminal. The method 500 may begin by determining frame rate conversion capabilities of a decoder (box 510). Using the decoder's FRC capabilities, the method may estimate a minimum frame rate that coded video must meet to achieve a specified level of coding quality for a video coding session (box 515). The method 500 may determine whether the frame rate of the source video exceeds the minimum frame rate for the session (box 520). If so, the method may decimate frames among the source video to achieve the minimum frame rate required by the session (box 525). Once the source video's frame rate matches the required minimum frame rate, either by decimation (box 525) or if the frame rate did not exceed the minimum rate (box 520), the method may code the video data (box 530). Alternatively, if the frame rate did not meet the minimum rate, the method 500 may perform an FRC of its own to boost the source frame rate to match the minimum frame rate identified by the estimate.

The method 500 may decode the coded video (box 535) and may perform frame rate conversion to a higher frame rate (box 540) by replicating FRC operations that likely will be performed by a decoder. The method 500 may estimate whether the frame rate conversion induces visual artifacts (box 545). If so, the method may develop corrective data that identifies regions in which visual artifacts are identified (box 550) and may transmit coded data of the frame along with corrective data that may be generated in box 545 (box 555).

As illustrated in FIG. 5, an encoding terminal may emulate frame rate conversion operations that are likely to be performed by a decoding terminal and may estimate artifacts that may arise from such operations. The encoding terminal, for example, may compare FRC results that it obtains, either to source video data or to decimated source video data, to identify regions where such artifacts are present. Oftentimes, such artifacts include occlusions, erratic motion or blurring among image content. Supplementary data may include replacement image content in areas where artifacts may be present. Alternatively, the supplementary data may include identifications of object depth, which a decoding terminal may apply to identify which content overlaps other content when motion "collisions" occurs, or may include identifications of filtering to be applied to such regions. In other embodiments, the supplementary data may include pixel residuals that represent a difference between a source frame's content and content that a decoder would create from its FRC processes. In yet another embodiment, the supplementary data may include identification of post-processing operations (for example, blurring filters) to be performed by a decoder on video obtained from FRC processes.

FIG. 6 illustrates communication flow 600 between a pair of terminals according to an embodiment of the present invention. The terminals may exchange signaling 610 to build a communication session between them. As part of this exchange, a decoding terminal may provide signaling 615 that identifies, to an encoding terminal, the decoding terminal's frame rate conversion capabilities. Based on this information and based on information identifying characteristics of input video, an encoding terminal may assign a frame rate at which input video is to be coded and may communicate this assignment to the decoding terminal 620. The terminals may exchange other signaling 625 to complete establishment of the communication session.

The video coding session may proceed. During the session, an encoding terminal may code video for delivery to the decoding terminal. Specifically, the coding terminal may decimate input video to achieve the frame rate identified to the decoding terminal (box 630). Decimation may include dropping of input frames and/or interpolation of frames from the input frames when the input frames are received at a frame rate higher than the frame rate identified to the decoding terminal. Thereafter, the encoding terminal may code the resultant video data at the selected frame rate (box 635). Video coding may exploit spatial and/or temporal redundancy in the resultant video data by, for example, coding according to motion-compensated prediction. Thereafter, the encoding terminal may estimate motion among the source video and, particularly, the decimated frames (box 640). The encoding terminal may estimate whether motion among the decimated frames is smooth as compared to motion of similar content in the coded frames (box 645). If not, then the encoding terminal may code supplementary data for the decimated frames which identifies motion irregularities (box 650). The encoding terminal may transmit data of the coded frames (arrow 655) and any supplementary data (arrow 660) to a decoding terminal. The encoding terminal may repeat the operations of elements 630-660 until the video session concludes (box 680).

The decoding terminal may recover video data during the video coding session. Specifically, the decoding terminal may decode the coded video data that it receives (box 665) by inverting coding operations applied by the encoding terminal. After decoding, the decoding terminal may generate recovered video data. In lossy coding processes, the recovered video data output by the decoding (box 665) may be a replica of the video data coded by the coding operation 635 but with some data loss. The decoding terminal may perform frame rate conversion (box 670) to increase the frame rate of the recovered video data and, in doing so, may apply motion estimates for decimated frames that were provided by an encoding terminal in arrow 660. Thereafter, the decoding terminal may render the resultant video data, for example, by presenting the video data on a display device (arrow 675). A decoding terminal may repeat the operations of boxes 665-675 until the video session conclude (box 680).

Operation of the method of FIG. 6 may involve signaling that goes beyond those provided by governing coding protocols. Where existing protocols, such as H.265 and H.264, include syntax to support exchange of coded video data, no known protocol provides for exchange of supplementary data that corresponds to frames that will be generated by decode-side FRC operations. Accordingly, an encoder may provide such data in a supplemental enhancement information (SEI) message under one of those protocols or, alternatively, it may be provided in a communication session that is built outside the confines of the coding protocol to which the encoding terminal and decoding terminal correspond.

The principles of the present invention may be extended to spatial upscaling as well. Where FRC processes involve temporal upscaling and interpolation. Spatial upscaling often involves increasing resolution of frame data using super-resolution techniques, usually involving motion estimation within a group frames around a frame that is to be upsampled. In an embodiment, encoding and decoding terminals may exchange signaling identifying which types of spatial upscaling may be performed by a decoder. Responsive to this signaling, an encoding terminal may estimate a minimum spatial resolution (frame size) that is appropriate for the coded video and perform spatial decimation of source frame data until the resultant video matches the minimum spatial resolution. Thereafter, the encoding terminal may code the resultant video and transmit the coded video to a channel.

The principles of the present invention also find application in a cloud-based video transcoding system. A video transcoder decodes coded video data, then recodes the resultant video data for delivery to another terminal. In an embodiment, a video transcoder in a cloud network may be provided with a high-quality FRC capability. In this application, an encoding terminal may perform one of the foregoing methods in a video coding session that extends between the encoding terminal and the video transcoder. As a result, the encoder likely would send coded video with a low frame rate to the video transcoder. The video transcoder may decode the coded video and may perform FRC processing on resultant video. Thereafter, the video transcoder may act as an encoding terminal, using one of the foregoing methods, and code the resultant video using a decoding terminal's FRC capabilities before delivering the transcoded video bitstream to the decoding terminal.

The foregoing discussion has described operation of the embodiments of the present invention in the context of coding terminals and decoding terminals. Commonly, these components are provided as electronic devices. Functional units of encoding terminals can be embodied in integrated circuits, such as application specific integrated circuits, field programmable gate arrays and/or digital signal processors. Alternatively, they can be embodied in computer programs that execute on personal computers, notebook computers or computer servers. Similarly, functional units of decoding terminals can be embodied in integrated circuits, such as application specific integrated circuits, field programmable gate arrays and/or digital signal processors, or they can be embodied in computer programs that execute on personal computers, notebook computers or computer servers. Decoding terminals commonly are packaged in consumer electronics devices, such as gaming systems, DVD players, portable media players and the like and they also can be packaged in consumer software applications such as video games, browser-based media players and the like. And, of course, these components may be provided as hybrid systems that distribute functionality across dedicated hardware components and programmed general-purpose processors as desired.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A coding method, comprising:
    estimating frame rate conversion (FRC) capabilities of a decoding device to change a frame rate of coded video data,
    selecting a frame rate of video to be coded based on the estimated FRC capabilities and an estimate of frame errors that would be induced by the FRC on decode with reference to source video,
    altering a frame rate of source video to match the selected frame rate,
    coding the altered source video, and
    outputting the coded source video to a channel.

2. The method of claim 1, wherein the estimated capabilities are obtained from a report provided by the decoding device.

3. The method of claim 1, wherein the estimated capabilities are obtained from a profile of the decoding device.

4. The method of claim 1, further comprising:
    decoding the coded source video,
    emulating FRC operations of the decoding device using the decoded source video,
    estimating artifacts generated by the FRC operations,
    coding supplementary data identifying discrepancies between the source video and FRC-generated video having the artifacts, and
    outputting the coded supplementary data to a channel.

5. The method of claim 4, wherein the supplementary data includes substitute video for FRC-generated video having the artifacts.

6. The method of claim 4, wherein the supplementary data includes depth information for portions of FRC-generated video having occlusions.

7. The method of claim 4, wherein the supplementary data includes coded residuals representing differences between a source frame and an FRC-generated frame.

8. The method of claim 4, wherein the supplementary data includes an identification of a post-processing technique to be applied to an FRC-generated frame.

9. The method of claim 4, wherein the supplementary data includes motion information for portions of FRC-generated video having motion that deviates from motion of the coded video.

10. The method of claim 1, wherein the altering includes decimating frames from the source video.

11. The method of claim 1, wherein the altering includes extrapolating frames from the source video at temporal locations that fall between select frames of the source video.

12. The coding method of claim 1, wherein:
the estimating further comprises estimating spatial upscaling capabilities of the decoding device,
the selecting further comprises selecting a frame resolution of the video to be coded based on the estimated upscaling capabilities,
the altering further comprises altering a frame resolution of the source video to match the selected frame resolution,
the coding further comprises coding the altered source video, and
the outputting further comprises outputting the coded source video to a channel.

13. A coding system, comprising:
a video source,
a controller to estimate frame rate conversion (FRC) capabilities of a decoding device to change a frame rate of coded video data, to estimate of frame errors that would be induced by the FRC on decode with reference to source video and to select a frame rate of coded video therefrom,
a pre-processor, responsive to inputs of the controller, to alter a frame rate of source video from the video source to match the selected frame rate,
a video coder to code the altered source video from the pre-processor, and
a transmitter to transmit coded source video from the video coder to a channel.

14. The system of claim 13, wherein the estimated capabilities are obtained from a report provided by the decoding device.

15. The system of claim 13, wherein the estimated capabilities are obtained from a profile of the decoding device.

16. The system of claim 13, further comprising:
decoding the coded source video,
emulating FRC operations of the decoding device using the decoded source video,
estimating artifacts generated by the FRC operations,
coding supplementary data identifying discrepancies between the source video and FRC-generated video having the artifacts, and
outputting the coded supplementary data to a channel.

17. The system of claim 16, wherein the supplementary data includes substitute video for FRC-generated video having the artifacts.

18. The system of claim 16, wherein the supplementary data includes depth information for portions of FRC-generated video having occlusions.

19. The system of claim 16, wherein the supplementary data includes motion information for portions of FRC-generated video having motion that deviates from motion of the coded video.

20. The system of claim 16, wherein the supplementary data includes coded residuals representing differences between a source frame and an FRC-generated frame.

21. The system of claim 16, wherein the supplementary data includes an identification of a post-processing technique to be applied to an FRC-generated frame.

22. The system of claim 13, wherein the altering includes decimating frames from the source video.

23. The system of claim 13, wherein the altering includes extrapolating frames from the source video at temporal locations that fall between select frames of the source video.

24. Non-transitory computer readable medium storing program instructions that, when executed by a processing device, cause the device to:
estimate frame rate conversion (FRC) capabilities of a decoding device, wherein the FRC capabilities comprise ability to convert video data from a first frame rate to a second frame rate,
select a frame rate of video to be coded based on the estimated FRC capabilities and based on an estimate of frame errors that would be induced by the FRC on decode with reference to source video,
alter a frame rate of source video to match the selected frame rate, and
code the altered source video, and
output the coded source video to a channel.

25. The medium of claim 24, wherein the estimated capabilities are obtained from a report provided by the decoding device.

26. The medium of claim 24, wherein the estimated capabilities are obtained from a profile of the decoding device.

27. The medium of claim 24, further comprising:
decoding the coded source video,
emulating FRC operations of the decoding device using the decoded source video,
estimating artifacts generated by the FRC operations,
coding supplementary data identifying discrepancies between the source video and FRC-generated video having the artifacts, and
outputting the coded supplementary data to a channel.

28. The medium of claim 27, wherein the supplementary data includes substitute video for FRC-generated video having the artifacts.

29. The medium of claim 27, wherein the supplementary data includes depth information for portions of FRC-generated video having occlusions.

30. The medium of claim 27, wherein the supplementary data includes motion information for portions of FRC-generated video having motion that deviates from motion of the coded video.

31. The medium of claim 27, wherein the supplementary data includes coded residuals representing differences between a source frame and an FRC-generated frame.

32. The medium of claim 27, wherein the supplementary data includes an identification of a post-processing technique to be applied to an FRC-generated frame.

33. The medium of claim 24, wherein the altering includes decimating frames from the source video.

34. The medium of claim 24, wherein the altering includes extrapolating frames from the source video at temporal locations that fall between select frames of the source video.

35. A coding method, comprising:
estimating frame rate conversion (FRC) capabilities of a decoding device to process coded video data,
selecting a frame rate of video to be coded based on the estimated FRC capabilities, altering a frame rate of source video to match the selected frame rate, and
coding the altered source video,
decoding the coded source video,
emulating FRC operations of the decoding device using the decoded video,
estimating artifacts generated by the FRC operations,
coding supplementary data identifying discrepancies between the source video and FRC-generated video having the artifacts, and
outputting the coded source video and the coded supplementary data to a channel.

36. A decoding method, comprising:
decoding coded video data received from a channel;
performing frame rate conversion upon the decoded video to increase a frame rate thereof;
responsive to receipt of supplementary data from the channel associated with a new frame of video generated by the frame rate conversion, altering the frame; and
rendering the resultant video.

\* \* \* \* \*